US011959386B2

(12) United States Patent
Rocco et al.

(10) Patent No.: US 11,959,386 B2
(45) Date of Patent: Apr. 16, 2024

(54) # MONITORING FLUID CONSUMPTION OF GAS TURBINE ENGINE DURING AN ENGINE CYCLE

(71) Applicant: Raytheon Technologies Corporation, Farmington, CT (US)

(72) Inventors: Edward T. Rocco, Rocky Hill, CT (US); Grant A. Carey, Richmond, VA (US); Bradley C. Schafer, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/712,882

(22) Filed: Apr. 4, 2022

(65) Prior Publication Data

US 2023/0313700 A1 Oct. 5, 2023

(51) Int. Cl.
*F01D 21/00* (2006.01)
*F01D 25/18* (2006.01)

(52) U.S. Cl.
CPC ........... *F01D 21/003* (2013.01); *F01D 25/18* (2013.01); *F05D 2220/323* (2013.01); *F05D 2260/80* (2013.01); *F05D 2260/98* (2013.01)

(58) Field of Classification Search
CPC .. F01D 21/003; F01D 25/18; F05D 2220/323; F05D 2260/80; F05D 2260/98
USPC .......................................................... 415/118
See application file for complete search history.

(56) References Cited

U.S. PATENT DOCUMENTS

| | | | | |
|---|---|---|---|---|
| 7,904,229 | B2 | 3/2011 | Walthall | |
| 8,103,462 | B2 | 1/2012 | Liu | |
| 8,401,760 | B2 | 3/2013 | Payne | |
| 8,483,902 | B2 | 7/2013 | Cornet | |
| 8,676,436 | B2 | 3/2014 | Raimarckers | |
| 8,887,509 | B2 | 11/2014 | Bonner | |
| 9,540,974 | B2 | 1/2017 | Demaison | |
| 9,790,826 | B2 | 10/2017 | Zhong | |
| 2011/0010069 | A1* | 1/2011 | Payne | F01D 21/003 701/100 |
| 2013/0218399 | A1* | 8/2013 | Demaison | F01D 25/18 701/33.9 |
| 2013/0325212 | A1 | 12/2013 | Wickman | |

(Continued)

FOREIGN PATENT DOCUMENTS

FR 3020093 A1 * 10/2015 ........... F01M 11/061

OTHER PUBLICATIONS

EP search report for EP23166639.7 dated Jul. 17, 2023.

*Primary Examiner* — Yi-Kai Wang
(74) *Attorney, Agent, or Firm* — Getz Balich LLC

(57) ABSTRACT

A method is provided for a gas turbine engine. During this method, a first lubricant parameter is determined during a first period of an engine operating cycle. The first lubricant parameter is indicative of a first quantity of lubricant within a reservoir of the gas turbine engine. A second lubricant parameter is determined during a second period of the engine operating cycle. The second lubricant parameter is indicative of a second quantity of the lubricant within the reservoir. The first lubricant parameter and the second lubricant parameter are compared to determine a lubricant consumption parameter. The lubricant consumption parameter is indicative of a quantity of the lubricant consumed by the gas turbine engine during the engine operating cycle.

19 Claims, 4 Drawing Sheets

(56) References Cited

U.S. PATENT DOCUMENTS

| | | | | |
|---|---|---|---|---|
| 2015/0073648 | A1 * | 3/2015 | Gu .......................... | F01D 17/20<br>701/29.5 |
| 2017/0159485 | A1 | 6/2017 | Jean | |
| 2017/0185937 | A1 | 6/2017 | Ricordeau | |
| 2022/0090515 | A1 | 3/2022 | Beecroft | |

* cited by examiner

MONITORING FLUID CONSUMPTION OF GAS TURBINE ENGINE DURING AN ENGINE CYCLE

BACKGROUND OF THE DISCLOSURE

1. Technical Field

This disclosure relates generally to a gas turbine engine and, more particularly, to monitoring fluid consumption within the gas turbine engine.

2. Background Information

A gas turbine engine may consume lubricant during operation, where this lubricant consumption may account for lubricant leakage out of a lubricant circuit, burning off of the lubricant, etc. Lubricant consumption is typically monitored over a course of many aircraft flights. Such monitoring, however, may be susceptible to error where, for example, additional lubricant is added into the gas turbine engine between flights, but not accurately recorded. There is a need in the art therefore for improved systems and methods for monitoring lubricant consumption within a gas turbine engine.

SUMMARY OF THE DISCLOSURE

According to an aspect of the present disclosure, a method is provided for a gas turbine engine. During this method, a first lubricant parameter is determined during a first period of an engine operating cycle. The first lubricant parameter is indicative of a first quantity of lubricant within a reservoir of the gas turbine engine. A second lubricant parameter is determined during a second period of the engine operating cycle. The second lubricant parameter is indicative of a second quantity of the lubricant within the reservoir. The first lubricant parameter and the second lubricant parameter are compared to determine a lubricant consumption parameter. The lubricant consumption parameter is indicative of a quantity of the lubricant consumed by the gas turbine engine during the engine operating cycle.

According to another aspect of the present disclosure, another method is provided for a gas turbine engine. During this method, a first lubricant parameter is determined at engine idle prior to an aircraft flight. The first lubricant parameter is indicative of a first quantity of lubricant within a reservoir of the gas turbine engine. A second lubricant parameter is determined at engine idle after the aircraft flight. The second lubricant parameter is indicative of a second quantity of lubricant within the reservoir. A lubricant consumption parameter is determined based on the first lubricant parameter and the second lubricant parameter. The lubricant consumption parameter is indicative of a quantity of the lubricant consumed by the gas turbine engine during the aircraft flight.

According to still another aspect of the present disclosure, a system is provided for a gas turbine engine. This gas turbine engine system includes a lubricant system, a sensor system and a monitoring system. The lubricant system includes a lubricant reservoir. The sensor system is configured to monitor lubricant within the lubricant reservoir. The monitoring system is configured to: determine a first lubricant parameter based on first sensor data received from the sensor system during a first period of an operating cycle of the gas turbine engine, where the first lubricant parameter is indicative of a first quantity of lubricant within the lubricant reservoir; determine a second lubricant parameter based on second sensor data received from the sensor system during a second period of the operating cycle of the gas turbine engine, where the second lubricant parameter is indicative of a second quantity of lubricant within the lubricant reservoir; and determine a lubricant consumption parameter based on the first lubricant parameter and the second lubricant parameter, where the lubricant consumption parameter is indicative of a quantity of the lubricant consumed by the gas turbine engine during the operating cycle.

The sensor system may also be configured to measure a parameter of the lubricant within the reservoir at a first point during the first period of the operating cycle of the gas turbine engine to provide a first measured parameter. The monitoring system may also be configured to normalize the first measured parameter to provide a normalize first measured parameter. The first lubricant parameter may be determined based on the normalized first measured parameter.

The sensor system may also be configured to measure the parameter of the lubricant within the reservoir at a second point during the first period of the operating cycle of the gas turbine engine to provide a second measured parameter. The monitoring system may also be configured to normalize the second measured parameter to provide a normalize second measured parameter. The first lubricant parameter may also be determined based on the normalized second measured parameter.

The method may also include: measuring a parameter of the lubricant within the reservoir at a first point during the first period of the engine operating cycle to provide a first measured parameter; and normalizing the first measured parameter to provide a normalize first measured parameter. The first lubricant parameter may be determined based on the normalized first measured parameter.

The method may also include: measuring the parameter of the lubricant within the reservoir at a second point during the first period of the engine operating cycle to provide a second measured parameter; and normalizing the second measured parameter to provide a normalize second measured parameter. The first lubricant parameter may also be determined based on the normalized second measured parameter.

The determining of the first lubricant parameter may include processing the normalized first measured parameter and the normalized second measured parameter to determine: an average normalized measured parameter; a median normalized measured parameter; a minimum normalized measured parameter; and/or a maximum normalized measured parameter.

The method may also include communicating information based on the lubricant consumption parameter.

The information may be communicated to personnel operating the gas turbine engine and/or personnel servicing the gas turbine engine.

The methods may also include: determining a second lubricant consumption parameter, where the second lubricant consumption parameter is indicative of a quantity of the lubricant consumed by the gas turbine engine during a second engine operating cycle; and processing at least the lubricant consumption parameter and the second lubricant consumption parameter to determine a lubricant consumption trend over a plurality of operating cycles of the gas turbine engine.

The gas turbine engine may be configured with an aircraft. The lubricant consumption trend may be determined onboard the aircraft.

The gas turbine engine may be configured with an aircraft. The lubricant consumption trend may be determined off-board the aircraft.

The engine operating cycle may correspond to operation of the gas turbine engine for a single aircraft flight.

The gas turbine engine may be operated at idle during the first period of the engine operating cycle and the second period of the engine operating cycle.

The gas turbine engine may be operated above idle during an intermediate period of the engine operating cycle occurring between the first period of the engine operating cycle and the second period of the engine operating cycle.

A first speed of a rotating assembly of the gas turbine engine during the first period of the engine operating cycle may be substantially equal to a second speed of the rotating assembly during the second period of the engine operating cycle.

A centerline of the gas turbine engine may be at a first position relative to a horizon line during the first period of the engine operating cycle. The centerline of the gas turbine engine may be at a second position relative to the horizon line during the second period of the engine operating cycle that may be substantially equal to the first position.

A first temperature of the lubricant during the first period of the engine operating cycle may be substantially equal to a second temperature of the lubricant during the second period of the engine operating cycle.

The lubricant may flow at a first flowrate during the first period of the engine operating cycle. The lubricant may flow at a second flowrate during the second period of the engine operating cycle that may be substantially equal to the first flowrate.

The gas turbine engine may be configured with an aircraft. The lubricant consumption parameter may be determined onboard the aircraft.

The gas turbine engine may be configured with an aircraft. The lubricant consumption parameter may be determined offboard the aircraft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
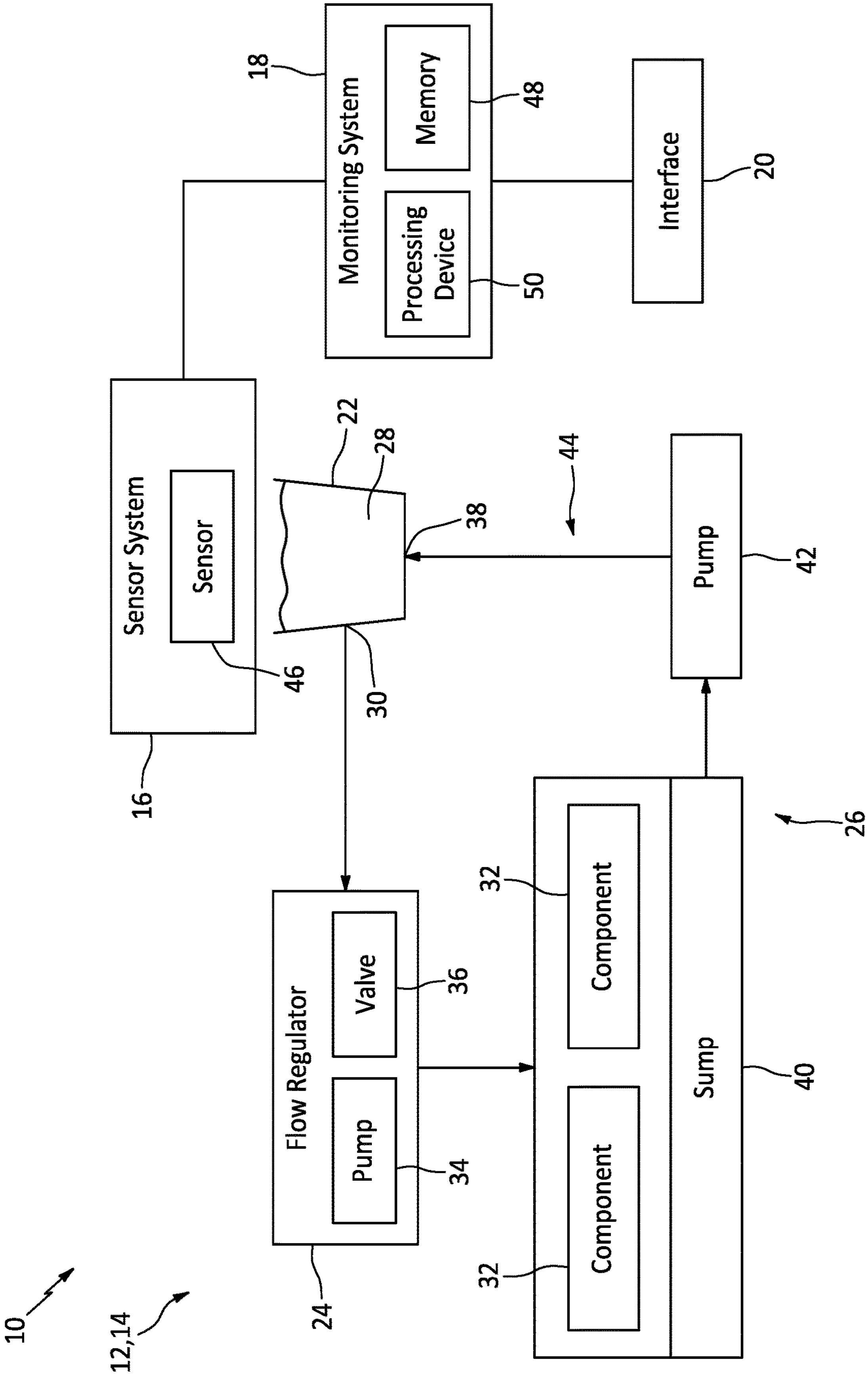
FIG. 1 is a schematic illustration of a system for a gas turbine engine.

FIG. 1 is a schematic illustration of a system 10 for a gas turbine engine. This engine system 10 includes a fluid system 12 configured to circulate fluid (e.g., liquid) within/through the gas turbine engine. The fluid may be lubricant (e.g., oil), coolant, hydraulic fluid and/or any other type of fluid utilized by and circulated within the gas turbine engine. However, for ease of description, the fluid system 12 is described below as a lubricant system 14 which circulates lubricant with/through the gas turbine engine. The engine system 10 of FIG. 1 also includes a sensor system 16, a monitoring system 18 and an interface 20; e.g., a user interface.

The lubricant system 14 includes a lubricant (e.g., fluid) reservoir 22, a lubricant (e.g., fluid) flow regulator 24 and a lubricant (e.g., fluid) collector 26. The lubricant reservoir 22 is configured to contain (e.g., store) a quantity of the lubricant within an internal cavity 28 of the lubricant reservoir 22 before, during and/or after operation of the gas turbine engine. The lubricant reservoir 22, for example, may be configured as or otherwise include a tank, a cylinder, a pressure vessel and/or a bladder. The lubricant flow regulator 24 is configured to direct a flow of the lubricant from an outlet 30 of the lubricant reservoir 22 to one or more components 32 of the gas turbine engine; e.g., bearings, gears, seals, etc. such as elements 82 and/or 88 in FIG. 4. The lubricant flow regulator 24, for example, may be configured as or otherwise include a lubricant pump 34 and/or a valve 36. The lubricant collector 26 is configured to collect the lubricant directed through (e.g., used by) or otherwise received from the one or more engine components 32 for return to an inlet 38 of the lubricant reservoir 22. The lubricant collector 26, for example, may be configured as or otherwise include a sump 40 in fluid communication with a return pump 42. The components 22, 24, 26 and 32 may be arranged together to provide the lubricant system 14 with a closed loop circuit 44. The present disclosure, however, is not limited to such an exemplary arrangement nor lubricant system components. The lubricant system 14, for example, may also include one or more additional components and/or one or more additional circuit legs.

The sensor system 16 is configured to provide sensor data indicative of a quantity of the lubricant within the lubricant reservoir 22. The sensor system 16, for example, may include at least one lubricant level sensor 46. This lubricant level sensor 46 is configured to measure a level of the lubricant within the lubricant reservoir 22 and, more particularly, within the reservoir cavity 28. The lubricant level correlates to the quantity of the lubricant within the lubricant reservoir 22 and its reservoir cavity 28.

The monitoring system 18 is configured to monitor a quantity of the lubricant within the gas turbine engine. This monitoring system 18, for example, may monitor the lubricant quantity during a single operating cycle of the gas turbine engine (engine operating cycle). The term engine operating cycle may describe a cycle of operating the gas turbine engine from engine startup (e.g., ignition) to engine shutdown. Such an engine operating cycle may correspond with a single mission for an aircraft (e.g., a single aircraft flight), where the gas turbine engine is configured as part of an aircraft propulsion system for the aircraft and/or is configured as part of a power generation system (e.g., an auxiliary power unit (APU)) for the aircraft. The present disclosure, however, is not limited to aircraft applications. The gas turbine engine, for example, may alternatively be configured as part of a power generation system for a land-based powerplant, etc.

The monitoring system 18 of FIG. 1 is in signal communication (e.g., hardwired and/or wirelessly coupled) with the sensor system 16 and the interface 20. The monitoring system 18 may be implemented with a combination of hardware and software. The hardware may include memory 48 and at least one processing device 50, which processing device 50 may include one or more single-core and/or multi-core processors. The hardware may also or alternatively include analog and/or digital circuitry other than that described above.

The memory 48 is configured to store software (e.g., program instructions) for execution by the processing device 50, which software execution may control and/or facilitate performance of one or more operations such as those described in the methods below. The memory 48 may be a non-transitory computer readable medium. For example, the memory 48 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The interface 20 is configured to communicate and/or transfer information received from the monitoring system 18. The interface 20, for example, may be configured as a user interface. This user interface may include a display screen, an indicator light, an electroacoustic transducer (e.g., a speaker) and/or a printer. With such an arrangement, the interface 20 is configured to visually and/or audibly present the information to a user; e.g., personnel operating the gas turbine engine (e.g., a pilot), personnel servicing the gas turbine engine (e.g., maintenance personnel), personnel monitoring performance of the gas turbine engine and/or the aircraft, etc. The interface 20, for example, may visually present the information on the display screen, via the indicator light and/or on a printer report provided by the printer. The interface 20 may also or alternatively audibly present the information via the electroacoustic transducer. The interface 20 may also or alternatively be configured as a device for transferring the information to another device and/or system. The interface 20, for example, may be configured as or otherwise include a (e.g., output) terminal or a signal transmitter.

Figure 2:
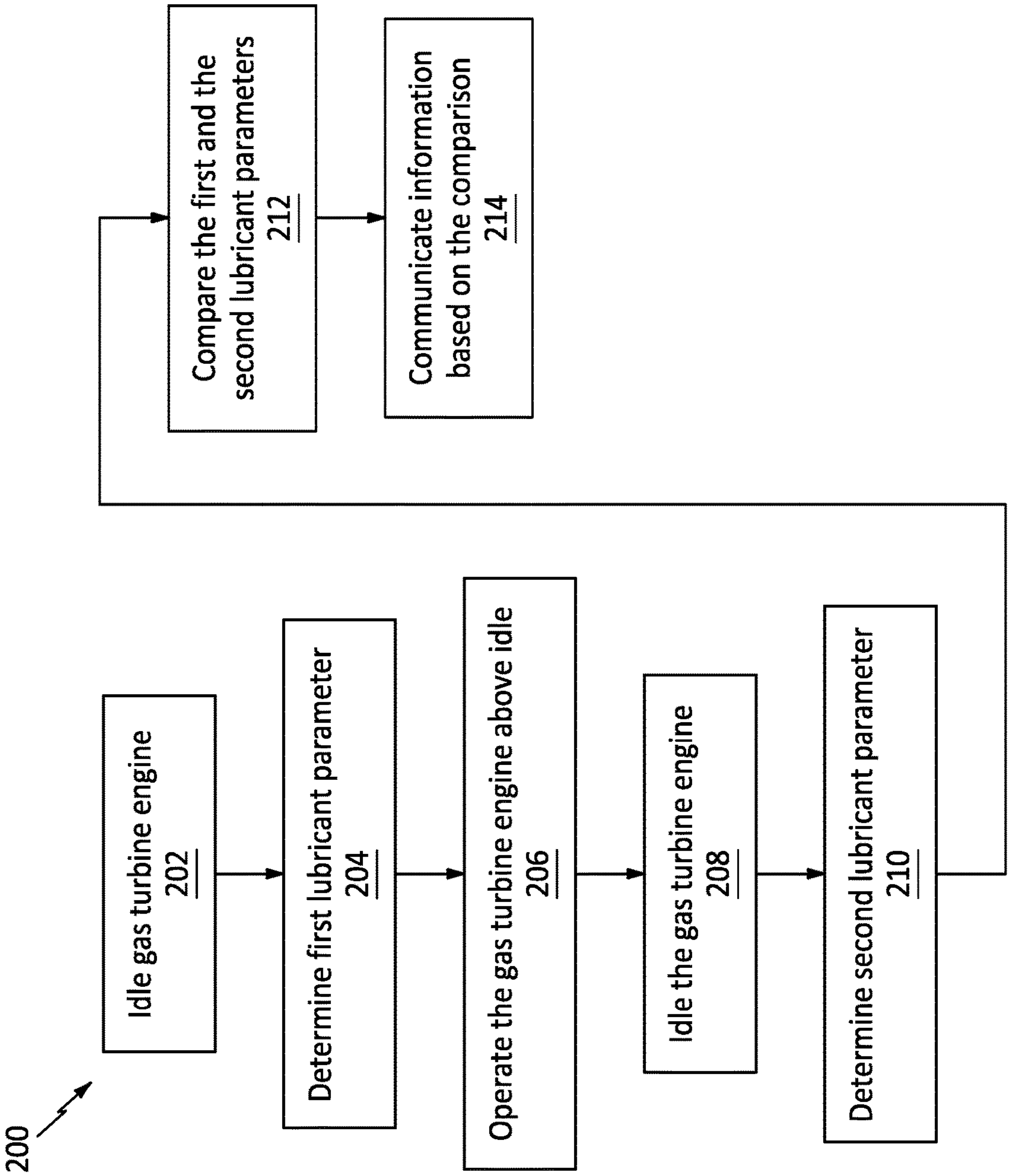
FIG. 2 is a method for operating and/or monitoring the gas turbine engine.

FIG. 2 is a flow diagram of a method 200 for operating and/or monitoring the gas turbine engine. For ease of description, the method 200 is describe below with reference to the engine system 10 of FIG. 1. The method 200 of the present disclosure, however, is not limited to any particular engine system configuration.

In step 202, the gas turbine engine is started up (e.g., ignited). This engine startup begins an operating cycle of the gas turbine engine. Following engine startup, the gas turbine engine is operated in idle. The gas turbine engine may be idled at an airport terminal and/or while taxiing to a runway for takeoff.

In step 204, a first lubricant parameter is determined during a first period of the engine operating cycle. The first lubricant parameter is indicative of a first (e.g., overall) quantity of the lubricant within the gas turbine engine and its lubricant system 14. The first lubricant parameter is also indicative of a first quantity and/or a first level of the lubricant within the lubricant reservoir 22 and its reservoir cavity 28. The first period may be during idle of the gas turbine engine; e.g., while the aircraft is at the airport terminal and/or while the aircraft is taxiing to the runway for takeoff.

To determine the first lubricant parameter, the sensor system 16 measures a parameter of the lubricant within the lubricant reservoir 22 and its reservoir cavity 28 during the first period. This parameter may be or may otherwise be indicative of a level of the lubricant and/or a quantity of the lubricant within the lubricant reservoir 22. The sensor system 16 provides first sensor data to the monitoring system 18, where the first sensor data is indicative of the measured parameter. The first sensor data may be provided at multiple points in time throughout the first period. Alternatively, the first sensor data may be provided at a single point in time during the first period.

The level/the quantity of the lubricant within the lubricant reservoir 22 and its reservoir cavity 28 may change throughout the engine operating cycle depending on a temperature of the lubricant and/or a flowrate of the lubricant into (e.g., via the inlet 38) and/or out (e.g., via the outlet 30) of the lubricant reservoir 22. For example, where the lubricant (A) flows out of the lubricant reservoir 22 at a first (e.g., relatively high) flowrate and/or a first (e.g., relatively low) temperature at a first point in time during the engine operating cycle, but (B) flows out of the lubricant reservoir 22 at a second (e.g., relatively slow) flowrate and/or a second (e.g., relatively high) temperature at a second point in time (before or after the first point in time) during the engine operating cycle, the level/the quantity of the lubricant measured in the lubricant reservoir 22 at the first point in time may be different (e.g., less) than at the second point in time. The lubricant temperature, for example, correlates to density of the lubricant. The flowrate may correlate to how much of the lubricant is within the lubricant reservoir 22 versus the rest of the lubricant system 14. However, even though the level/the quantity of the lubricant within the lubricant reservoir 22 may change throughout the engine operating cycle, the overall quantity of the lubricant within the gas turbine engine and its lubricant system 14 at both the first and the second points in time maybe the same. Therefore, to account for such measurement variation, the monitoring system 18 may normalize the first sensor data received from the sensor system 16. Note, the first lubricant parameter is typically determined when the flowrate of the lubricant into the lubricant reservoir 22 matches (e.g., is equal to) the flowrate of the lubricant out of the lubricant reservoir 22; e.g., when lubricant flow into and out of the lubricant reservoir 22 has stabilized. However, additional normalization may be possible to account for slight filling and/or draining of the lubricant reservoir 22.

The first sensor data (e.g., the measured lubricant level or quantity) may be normalized using a reference temperature parameter and/or a reference flowrate parameter. The reference temperature parameter may be indicative of or associated with a select (e.g., minimum) temperature of the lubricant within the lubricant system 14; e.g., within the lubricant reservoir 22. The reference flowrate parameter may be indicative of a select (e.g., minimum) flowrate of the lubricant into and/or out of the lubricant reservoir 22. Alternatively, the reference flowrate parameter may be indicative of a speed of a shaft which rotates at a common (e.g., the same) speed as the lubricant pump 34, a position of the valve 36, and/or any other parameter associated with and thereby indicative of the lubricant flowrate.

The monitoring system 18 may determine the first lubricant parameter based on the normalized first sensor data. The first lubricant parameter, for example, may be equal to or otherwise determined from: (1) an (e.g., time) average of some or all of the normalized first sensor data (e.g., during an acquisition period); (2) a median of some or all of the normalized first sensor data; (3) a maximum of some or all of the normalized first sensor data; and/or (4) a minimum of some or all of the normalized first sensor data. Of course, the first lubricant parameter may alternatively be determined based on normalized sensor data derived from a measurement taken for a single point of time during the first period.

In step 206, the gas turbine engine is operated above idle. The gas turbine engine, for example, is powered up for takeoff, climb, cruise, descent and/or landing.

In step 208, the gas turbine engine is powered back down to idle. The gas turbine engine may be idled while taxiing from a runway to an airport terminal (or other destination) following landing and/or at the airport terminal (or other destination). The gas turbine engine may subsequently be shutdown. This engine shutdown ends the operating cycle of the gas turbine engine which began in the step 202.

In step 210, a second lubricant parameter is determined during a second period of the engine operating cycle. The second lubricant parameter is indicative of a second (e.g., overall) quantity of the lubricant within the gas turbine engine and its lubricant system 14. The second lubricant parameter is also indicative of a second quantity and/or a second level of the lubricant within the lubricant reservoir 22 and its reservoir cavity 28. The second period may be during idle of the gas turbine engine; e.g., while the aircraft is taxiing to or parked at the airport terminal.

To determine the second lubricant parameter, the sensor system 16 measures the parameter of the lubricant within the lubricant reservoir 22 and its reservoir cavity 28 during the second period. Again, this parameter may be or may otherwise be indicative of the level of the lubricant and/or the quantity of the lubricant within the lubricant reservoir 22. The sensor system 16 provides second sensor data to the monitoring system 18, where the second sensor data is indicative of the measured parameter. The second sensor data may be provided at multiple points in time throughout the second period. Alternatively, the second sensor data may be provided at a single point in time during the second period.

The second sensor data (e.g., the measured lubricant level or quantity) may be normalized using the reference temperature parameter and/or the reference flowrate parameter. The monitoring system 18 may then determine the second lubricant parameter based on the normalized second sensor data. The second lubricant parameter, for example, may be equal to or otherwise determined from: (1) an average of some or all of the normalized second sensor data; (2) a median of some or all of the normalized second sensor data; (3) a maximum of some or all of the normalized second sensor data; and/or (4) a minimum of some or all of the normalized second sensor data. Of course, the second lubricant parameter may alternatively be determined based on normalized sensor data derived from a measurement taken for a single point of time during the second period.

In step 212, the first lubricant parameter is compared to the second lubricant parameter. The monitoring system 18, for example, may subtract the second lubricant parameter from the first lubricant parameter to provide a lubricant consumption parameter. This lubricant consumption parameter (the difference) is indicative of a quantity of the lubricant consumed by the gas turbine engine during a common (e.g., the same) engine operating cycle.

In step 214, communicating information based on the lubricant consumption parameter. For example, where the lubricant consumption parameter is equal to or greater than a threshold, the monitoring system 18 may signal the interface 20 to provide an alert to interested personnel. The alert, for example, may be provided to the personnel operating the gas turbine engine (e.g., the pilot), the personnel servicing the gas turbine engine (e.g., maintenance personnel), and/or the personnel monitoring performance of the gas turbine engine and/or the aircraft. The alert may be in the forms of an indicator light, an indicator tone, a warning and/or a service request.

The interface 20 may also or alternatively provide information regarding the lubricant consumption of the gas turbine engine to the interested personnel. This information may be indicative of: a quantity of the lubricant consumed (e.g., leaked, burnt, etc.) during the engine operating cycle; a quantity of the lubricant remaining within the lubricant system 14 and/or its lubricant reservoir 22; and/or a rate of lubricant consumption. The lubricant consumption rate may be determined by dividing the lubricant consumption parameter (e.g., the difference between the first lubricant parameter and the second lubricant parameter) by a period of time between the first and the second periods of the engine operating cycle. The information may be provided where the lubricant consumption parameter is greater than, equal to and/or less than the threshold, for example, in order to provide additional data to the interested personnel.

The interface 20 may provide the alert and/or the information to the interested personnel during (e.g., near an end of) the engine operating cycle. The interface 20 may also or alternatively provide the alert and/or the information to the interested personnel following the engine operating cycle, but prior to a subsequent engine operating cycle. Of course, the interface 20 may still also or alternatively provide the alert and/or the information to the interested personnel at any other point in time. The memory 48, for example, may store the information, the lubricant consumption parameter, elapsed time between first and second period measurements, etc. for later retrieval and/or communication to another device and/or system.

At least the method steps 202, 204, 206, 208, 210 and 212 may be repeated for one or more additional operating cycles of the gas turbine engine. The lubricant consumption parameters from some or all of these engine operating cycles may be processed to determine additional lubricant consumption information; e.g., the lubricant consumption rate over multiple engine operating cycles, etc.

Where the gas turbine engine is configured with an aircraft, the method steps above may be performed onboard the aircraft. Alternatively, some of the method steps may be performed onboard the aircraft and some of the steps may be performed off/remote of the aircraft. For example, the monitoring system 18 may be arranged remote from the aircraft. Here, the sensor system 16 may measure the parameters to provide the sensor data. This sensor data may then be communicated to the monitoring system 18 during an aircraft mission. The sensor data may also or alternatively be stored onboard the aircraft via an onboard memory, and then communicated to the monitoring system 18 at the end of or after the mission; e.g., after aircraft landing.

The method 200 is described above with the first period occurring during engine idle at the beginning of the engine operating cycle and the second period occurring during engine idle at the end of the engine operating cycle. The lubricant level/the lubricant quantity may thereby be measured at similar engine operating conditions. A first speed of a rotating assembly (e.g., a spool) within the gas turbine engine during the first period, for example, may be exactly or substantially (e.g., +/−2% or 5%) equal to a second speed of the rotating assembly during the second period. Thus, the lubricant temperatures and the lubricant flowrates are more likely to be similar during the first and the second periods. For example, the temperatures of the lubricant within the lubricant reservoir 22 during the first and the second periods may be exactly or substantially (e.g., +/−2% or 5%) equal.

Figure 3:
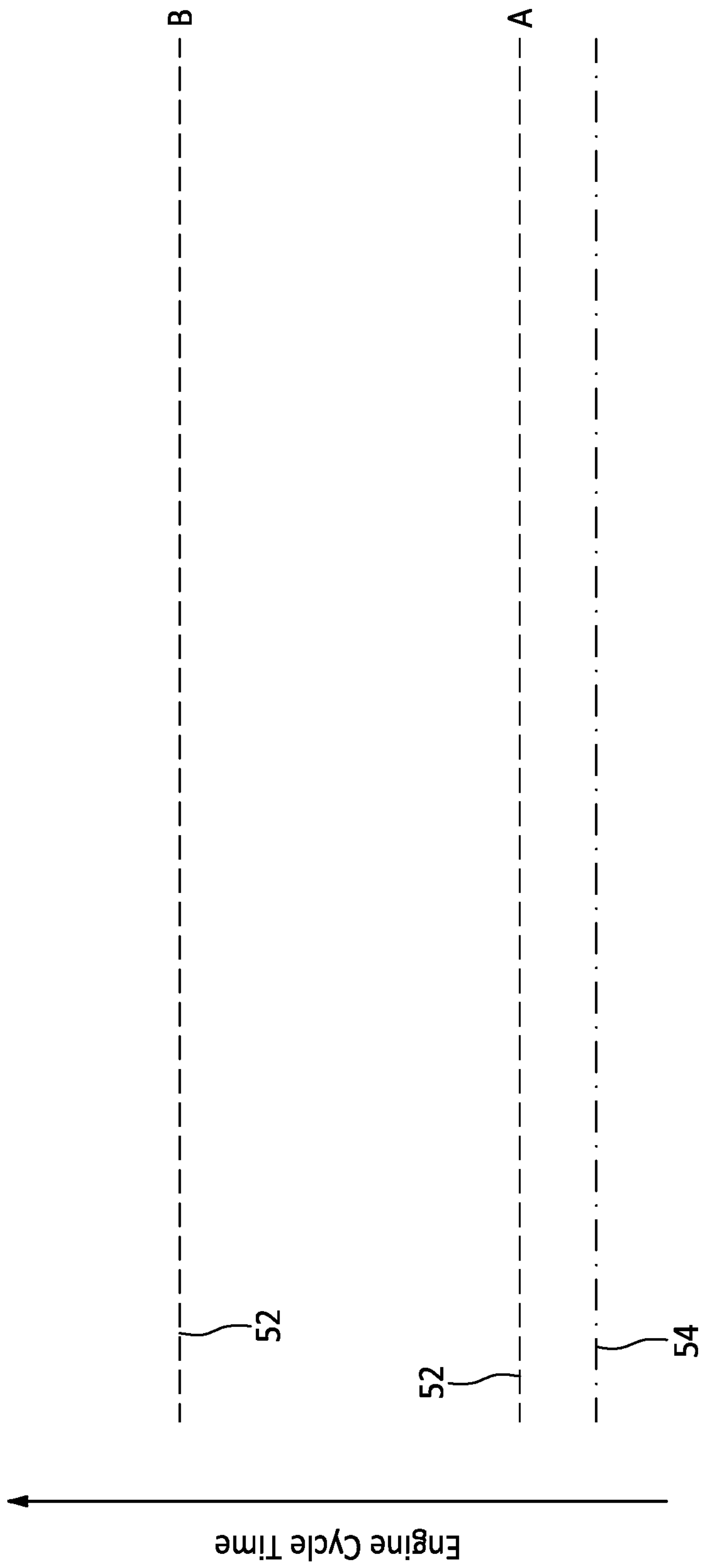
FIG. 3 is a schematic illustration of a gas turbine engine centerline relative to a horizon line during first and second periods of an engine operating cycle.

The flowrates of the lubricant into and/or out of the lubricant reservoir 22 during the first and the second periods may also or alternatively be exactly or substantially (e.g., +/−2% or 5%) equal. Furthermore, referring to FIG. 3, the aircraft will likely be at a similar orientation when the gas turbine engine is at idle; e.g., substantially horizontal on the ground. A centerline 52 of the gas turbine engine, for example, may be at a first position (e.g., orientation) relative to a (e.g., gravitational) horizon line 54 during the first period (see line A in FIG. 3), and the centerline 52 may be at a second position (e.g., orientation) relative to the horizon line 54 during the second period (see line B in FIG. 3) that is exactly or substantially (e.g., +/−2° or 5°) equal to the first position. Of course, similar conditions may also be present outside of idle during, for example, long flights. Under such circumstances, the first period and the second period may occur while the gas turbine engine is powered up above idle; e.g., during stable aircraft cruise.

Figure 4:
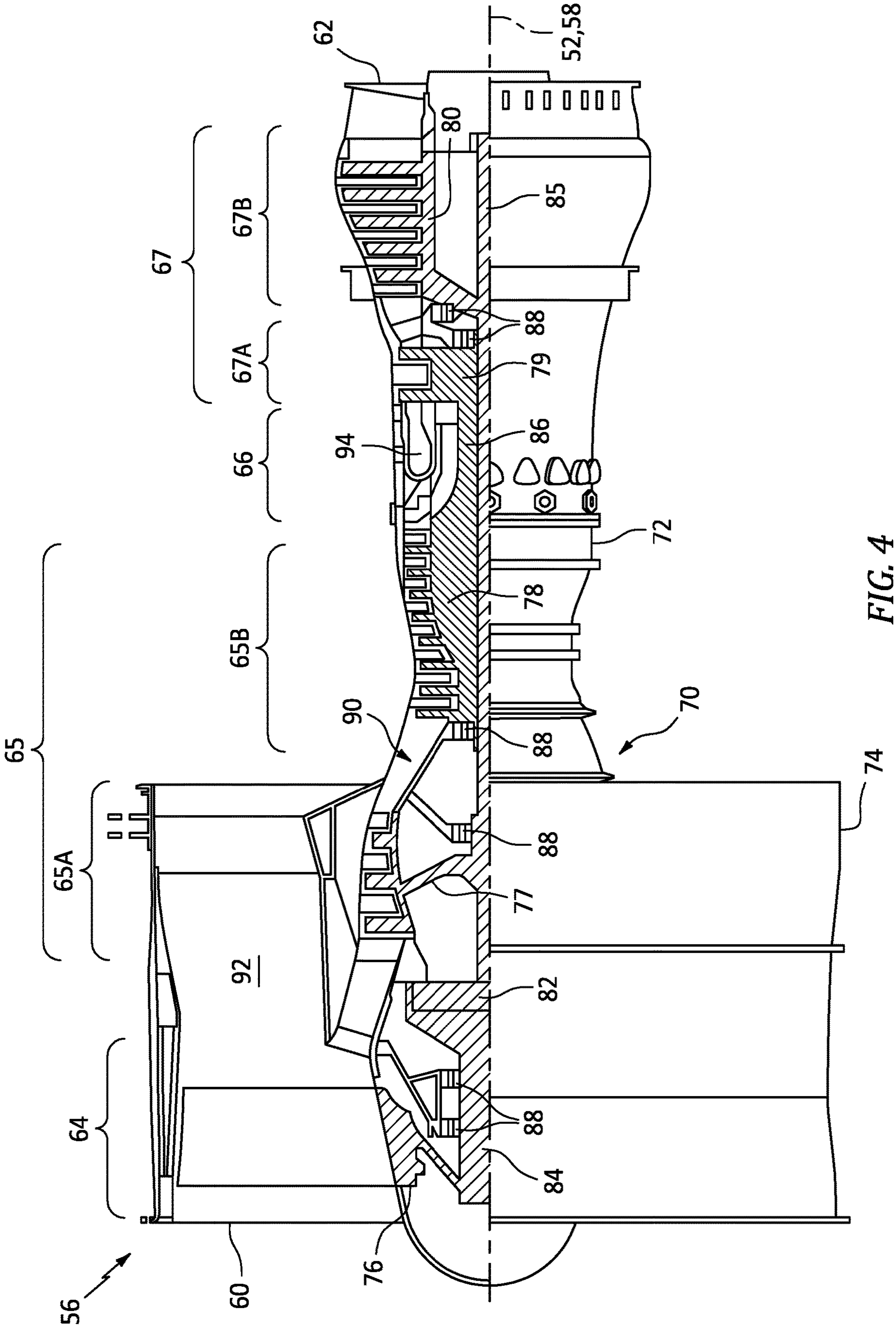
FIG. 4 is a side cutaway illustration of the gas turbine engine.

FIG. 4 illustrates an embodiment of the gas turbine engine configured as a geared turbofan gas turbine engine 56. This gas turbine engine 56 of FIG. 4 extends along an axial centerline 58 (e.g., the centerline 52) between an upstream airflow inlet 60 and a downstream airflow exhaust 62. The gas turbine engine 56 includes a fan section 64, a compressor section 65, a combustor section 66 and a turbine section 67. The compressor section 65 of FIG. 4 includes a low pressure compressor (LPC) section 65A and a high pressure compressor (HPC) section 65B. The turbine section 67 of FIG. 4 includes a high pressure turbine (HPT) section 67A and a low pressure turbine (LPT) section 67B.

The engine sections 64, 65A, 65B, 66, 67A and 67B are arranged sequentially along the axial centerline 58 within an engine housing 70. This engine housing 70 includes an inner case 72 (e.g., a core case) and an outer case 74 (e.g., a fan case). The inner case 72 may house one or more of the engine sections 65A, 65B, 66, 67A and 67B; e.g., an engine core. The outer case 74 may house at least the fan section 64.

Each of the engine sections 64, 65A, 65B, 67A and 67B includes a respective bladed rotor 76-80. Each of these bladed rotors 76-80 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 76 is connected to a gear train 82, for example, through a fan shaft 84. The gear train 82 and the LPC rotor 77 are connected to and driven by the LPT rotor 80 through a low speed shaft 85. The engine components 76, 77, 80, 84 and 85 may collectively form a low speed rotating assembly of the gas turbine engine 56. The HPC rotor 78 is connected to and driven by the HPT rotor 79 through a high speed shaft 86. The engine components 78, 79 and 86 may collectively form a high speed rotating assembly of the gas turbine engine 56. The shafts 84-86 are rotatably supported by a plurality of bearings 88; e.g., rolling element and/or thrust bearings. Each of these bearings 88 is connected to the engine housing 70 by at least one stationary structure such as, for example, an annular support strut.

During operation, air enters the gas turbine engine 56 through the airflow inlet 60. This air is directed through the fan section 64 and into a core gas path 90 and a bypass gas path 92. The core gas path 90 extends sequentially through the engine sections 65A, 65B, 66, 67A and 67B; e.g., an engine core. The air within the core gas path 90 may be referred to as "core air". The bypass gas path 92 extends through a bypass duct, which bypasses the engine core. The air within the bypass gas path 92 may be referred to as "bypass air".

The core air is compressed by the LPC rotor 77 and the HPC rotor 78 and directed into a combustion chamber 94 of a combustor in the combustor section 66. Fuel is injected into the combustion chamber 94 and mixed with the compressed core air to provide a fuel-air mixture. This fuel-air mixture is ignited and combustion products thereof flow through and sequentially cause the HPT rotor 79 and the LPT rotor 80 to rotate. The rotation of the HPT rotor 79 and the LPT rotor 80 respectively drive rotation of the HPC rotor 78 and the LPC rotor 77 and, thus, compression of the air received from a core airflow inlet. The rotation of the LPT rotor 80 also drives rotation of the fan rotor 76, which propels bypass air through and out of the bypass gas path 92. The propulsion of the bypass air may account for a majority of thrust generated by the turbine engine, e.g., more than seventy-five percent (75%) of engine thrust. The turbine engine of the present disclosure, however, is not limited to the foregoing exemplary thrust ratio.

The engine system 10 may be configured for various gas turbine engines other than the one described above. The engine system 10, for example, may be configured for a geared turbine engine where a gear train connects one or more shafts to one or more rotors in a fan section, a compressor section and/or any other engine section. Alternatively, the engine system 10 may be configured for a turbine engine configured without a gear train; e.g., a direct drive engine. The engine system 10 may be configured for a gas turbine engine with a single spool, with two spools (e.g., see FIG. 4), or with more than two spools. The gas turbine engine may be configured as a turbofan engine, a turbojet engine, a turboprop engine, a turboshaft engine, a propfan engine, a pusher fan engine or any other type of gas turbine engine for aircraft propulsion. The gas turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for a gas turbine engine, comprising:

determining a first lubricant parameter during a first period of an engine operating cycle, the first lubricant parameter indicative of a first quantity of lubricant within a reservoir of the gas turbine engine, and the engine operating cycle corresponding to operation of the gas turbine engine for a single aircraft flight;

determining a second lubricant parameter during a second period of the engine operating cycle, the second lubricant parameter indicative of a second quantity of the lubricant within the reservoir; and comparing the first lubricant parameter and the second lubricant parameter to determine a lubricant consumption parameter, the lubricant consumption parameter indicative of a quantity of the lubricant consumed by the gas turbine engine during the engine operating cycle.

2. The method of claim 1, further comprising:

measuring a parameter of the lubricant within the reservoir at a first point during the first period of the engine operating cycle to provide a first measured parameter; and normalizing the first measured parameter to provide a normalized first measured parameter;

wherein the first lubricant parameter is determined based on the normalized first measured parameter.

3. The method of claim 2, further comprising:

measuring the parameter of the lubricant within the reservoir at a second point during the first period of the engine operating cycle to provide a second measured parameter; and normalizing the second measured parameter to provide a normalized second measured parameter;

wherein the first lubricant parameter is determined further based on the normalized second measured parameter.

4. The method of claim 3, wherein the determining of the first lubricant parameter comprises processing the normalized first measured parameter and the normalized second measured parameter to determine at least one of an average normalized measured parameter;

a median normalized measured parameter;

a minimum normalized measured parameter; or a maximum normalized measured parameter.

5. The method of claim 1, further comprising communicating information based on the lubricant consumption parameter.

6. The method of claim 5, wherein the information is communicated to at least one of personnel operating the gas turbine engine or personnel servicing the gas turbine engine.

7. The method of claim 1, further comprising:

determining a second lubricant consumption parameter, the second lubricant consumption parameter indicative of a quantity of the lubricant consumed by the gas turbine engine during a second engine operating cycle; and processing at least the lubricant consumption parameter and the second lubricant consumption parameter to determine a lubricant consumption trend over a plurality of operating cycles of the gas turbine engine.

8. The method of claim 1, wherein the gas turbine engine is operated at idle during the first period of the engine operating cycle and the second period of the engine operating cycle.

9. The method of claim 8, wherein the gas turbine engine is operated above idle during an intermediate period of the engine operating cycle occurring between the first period of the engine operating cycle and the second period of the engine operating cycle.

10. The method of claim 1, wherein a first speed of a rotating assembly of the gas turbine engine during the first period of the engine operating cycle is substantially equal to a second speed of the rotating assembly during the second period of the engine operating cycle.

11. The method of claim 1, wherein a centerline of the gas turbine engine is at a first position relative to a horizon line during the first period of the engine operating cycle; and the centerline of the gas turbine engine is at a second position relative to the horizon line during the second period of the engine operating cycle that is substantially equal to the first position.

12. The method of claim 1, wherein a first temperature of the lubricant during the first period of the engine operating cycle is substantially equal to a second temperature of the lubricant during the second period of the engine operating cycle.

13. The method of claim 1, wherein the lubricant flows at a first flowrate during the first period of the engine operating cycle; and the lubricant flows at a second flowrate during the second period of the engine operating cycle that is substantially equal to the first flowrate.

14. The method of claim 1, wherein the gas turbine engine is configured with an aircraft; and the lubricant consumption parameter is determined onboard the aircraft.

15. The method of claim 1, wherein the gas turbine engine is configured with an aircraft; and the lubricant consumption parameter is determined off-board the aircraft.

16. A method for a gas turbine engine, comprising:

determining a first lubricant parameter at engine idle prior to an aircraft flight, the first lubricant parameter indicative of a first quantity of lubricant within a reservoir of the gas turbine engine;

determining a second lubricant parameter at engine idle after the aircraft flight, the second lubricant parameter indicative of a second quantity of lubricant within the reservoir; and determining a lubricant consumption parameter based on the first lubricant parameter and the second lubricant parameter, the lubricant consumption parameter indicative of a quantity of the lubricant consumed by the gas turbine engine during the aircraft flight.

17. A system for a gas turbine engine, comprising:

a lubricant system with a lubricant reservoir;

a sensor system configured to monitor lubricant within the lubricant reservoir; and a monitoring system configured to determine a first lubricant parameter based on first sensor data received from the sensor system while the gas turbine engine is operating during a first period of an operating cycle of the gas turbine engine, the first lubricant parameter indicative of a first quantity of lubricant within the lubricant reservoir;

determine a second lubricant parameter based on second sensor data received from the sensor system while the gas turbine engine is operating during a second period of the operating cycle of the gas turbine engine, the second lubricant parameter indicative of a second quantity of lubricant within the lubricant reservoir; and determine a lubricant consumption parameter based on the first lubricant parameter and the second lubricant parameter, the lubricant consumption parameter indicative of a quantity of the lubricant consumed by the gas turbine engine during the operating cycle.

18. The system of claim 17, wherein the sensor system is further configured to measure a parameter of the lubricant within the reservoir at a first point during the first period of the operating cycle of the gas turbine engine to provide a first measured parameter;

the monitoring system is further configured to normalize the first measured parameter to provide a normalized first measured parameter; and the first lubricant parameter is determined based on the normalized first measured parameter.

19. The method of claim 1, further comprising communicating information to personnel where the lubricant comparison parameter is equal to or greater than a threshold, the information indicative of at least one of:

the quantity of the lubricant consumed by the gas turbine engine during the engine operating cycle;

a quantity of the lubricant remaining within the lubricant reservoir; or a rate of lubricant consumption.

* * * * *